(12) United States Patent
Lin et al.

(10) Patent No.: US 10,230,937 B2
(45) Date of Patent: Mar. 12, 2019

(54) METHOD OF DERIVING DEFAULT DISPARITY VECTOR IN 3D AND MULTIVIEW VIDEO CODING

(71) Applicant: HFI Innovation Inc., Zhubei, Hsinchu County (TW)

(72) Inventors: Jian-Liang Lin, Su'ao Township, Yilan County (TW); Na Zhang, Shangqiu (CN); Yi-Wen Chen, Taichung (TW); Jicheng An, Beijing (CN); Yu-Lin Chang, Taipei (TW)

(73) Assignee: HFI Innovation Inc., Zhubei, Hsinchu County (TW)

( * ) Notice: Subject to any disclaimer, the term of this patent is extended or adjusted under 35 U.S.C. 154(b) by 90 days.

(21) Appl. No.: 14/908,273

(22) PCT Filed: Aug. 13, 2014

(86) PCT No.: PCT/CN2014/084240
§ 371 (c)(1),
(2) Date: Jan. 28, 2016

(87) PCT Pub. No.: WO2015/021914
PCT Pub. Date: Feb. 19, 2015

(65) Prior Publication Data
US 2016/0182884 A1 Jun. 23, 2016

Related U.S. Application Data
(60) Provisional application No. 61/895,468, filed on Oct. 25, 2013, provisional application No. 61/865,346, filed on Aug. 13, 2013.

(51) Int. Cl.
*H04N 13/00* (2018.01)
*H04N 19/136* (2014.01)
(Continued)

(52) U.S. Cl.
CPC ......... *H04N 13/161* (2018.05); *H04N 19/124* (2014.11); *H04N 19/136* (2014.11);
(Continued)

(58) Field of Classification Search
None
See application file for complete search history.

(56) References Cited

U.S. PATENT DOCUMENTS 6,055,274 A 4/2000 McVeigh
2008/0170618 A1 7/2008 Choi et al.
(Continued)

FOREIGN PATENT DOCUMENTS

CA 2 846 425 A1 3/2013
CN 101222639 7/2008
(Continued)

OTHER PUBLICATIONS

Tech et al. ("3D-HEVC Test Model 1", ITU-T Jul. 2012).*
(Continued)

*Primary Examiner* — Kate H Luo
(74) *Attorney, Agent, or Firm* — Oblon, McClelland, Maier & Neustadt, L.L.P.

(57) ABSTRACT

A method and apparatus for a three-dimensional or multi-view video encoding or decoding system utilizing unified disparity vector derivation is disclosed. When a three-dimensional coding tool using a derived disparity vector (DV) is selected, embodiments according to the present invention will first obtain the derived DV from one or more neighboring blocks. If the derived DV is available, the selected three-dimensional coding tool is applied to the current block using the derived DV. If the derived DV is not available, the selected three-dimensional coding tool is applied to the current block using a default DV, where the
(Continued)

default DV is set to point to an inter-view reference picture in a reference picture list of the current block.

20 Claims, 4 Drawing Sheets

(51) Int. Cl.
*H04N 19/44* (2014.01)
*H04N 19/124* (2014.01)
*H04N 19/176* (2014.01)
*H04N 13/161* (2018.01)
*H04N 19/597* (2014.01)
*H04N 19/52* (2014.01)
*H04N 19/593* (2014.01)

(52) U.S. Cl.
CPC ........... *H04N 19/176* (2014.11); *H04N 19/44* (2014.11); *H04N 19/52* (2014.11); *H04N 19/593* (2014.11); *H04N 19/597* (2014.11); *H04N 2013/0081* (2013.01)

(56) References Cited

U.S. PATENT DOCUMENTS

| | | | |
|---|---|---|---|
| 2010/0220791 A1 | 9/2010 | Lin et al. | |
| 2011/0216833 A1* | 9/2011 | Chen | H04N 13/0022 375/240.16 |
| 2013/0114724 A1* | 5/2013 | Maeda | H04N 19/105 375/240.16 |
| 2013/0229485 A1* | 9/2013 | Rusanovskyy | H04N 13/0048 348/43 |

FOREIGN PATENT DOCUMENTS

| | | |
|---|---|---|
| CN | 101415115 | 4/2009 |
| CN | 101601304 | 12/2009 |
| WO | WO 2013/03.0456 A1 | 3/2013 |
| WO | WO 2015/021914 A1 | 2/2015 |

OTHER PUBLICATIONS

Tech, et al.: "3D-HEVC Draft Text 1"; Joint Collaborative Team on 3D Video Coding Extension Development of ITU-T SG 16 WP 3 and ISO/IEC JTC 1/SC 29/WG 11; 5th Meeting: Vienna, AT, Jul. 27-Aug. 2, 2013; pp. 1-88.

Zhang, et al: "3D-CE2.h related: Bug fix for issues caused by reference view selection"; Joint Collaborative Team on 3D Video Coding Extensions of ITU-T SG 16 WP 3 and ISO/IEC JTC 1/SC 29/WG 11; 5th Meeting: Vienna, AT, Jul. 27-Aug. 2, 2013; pp. 1-6.

Chen, et al.: "3D-CE2.h related: Problem fix of the DV derivation in 3D-HEVC"; Joint Collaborative Team on 3D Video Coding Extensions of ITU-T SG 16 WP 3 and ISO/IEC JTC 1/SC 29/WG 11; 6th Meeting: Geneva, CH, Oct. 25-Nov. 1, 2013; pp. 1-4.

Chen, et al.: "AHG5: Comments on default NBDV view selection and ARP target reference picture"; Joint Collaborative Team on 3D Video Coding Extensions of ITU-T SG 16 WP 3 and ISO/IEC JTC 1/SC 29/WG 11; 7th Meeting: San Jose, US, Jan. 11-17, 2014; pp. 1-4.

International Search Report dated Nov. 18, 2014, issued in application No. PCT/CN2014/084240.

CN Office Action dated Feb. 5, 2018 in Patent Application No. 201480043802.9 with English translation, 29 pages.

Gerhard Tech et al.: Joint Collaborative Team on 3D Video Coding Extension Development of ITU-T SG 16 WP 3 and ISO/IEC JTC 1/SC 29/WG11, 1st Meeting, Stockholm, SE, Jul. 16-20, 2012, 83 pages.

* cited by examiner

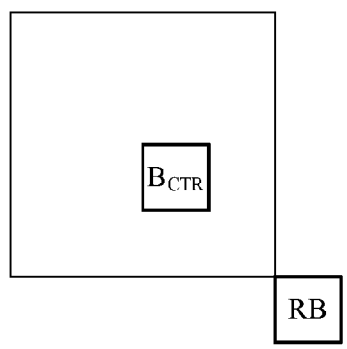
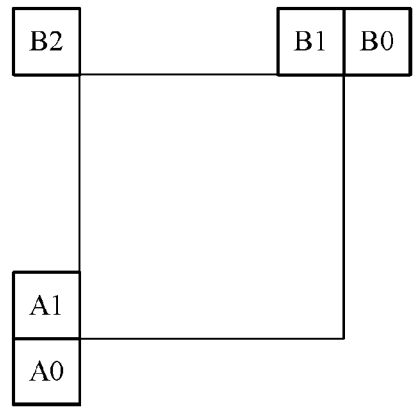
Fig. 2A
Fig. 2B
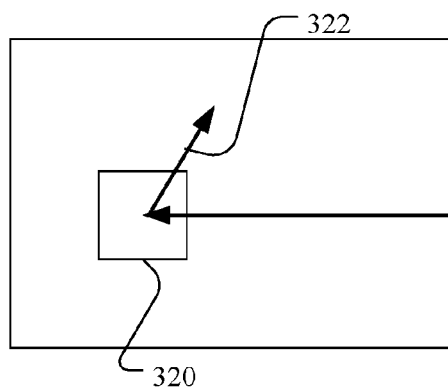
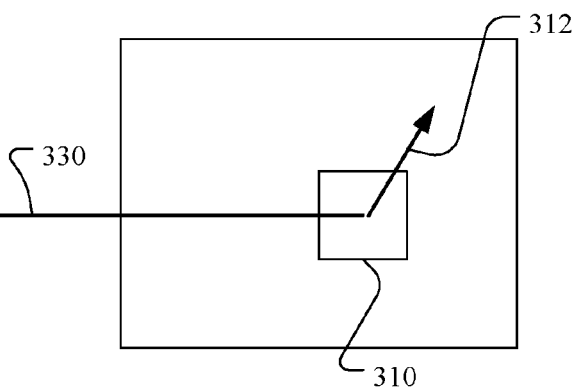
Inter-view reference picture
Dependent view
Fig. 3

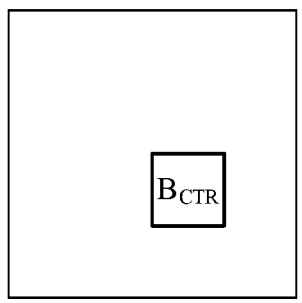
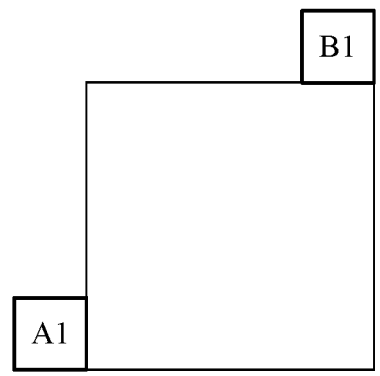
Fig. 4A
Fig. 4B

METHOD OF DERIVING DEFAULT DISPARITY VECTOR IN 3D AND MULTIVIEW VIDEO CODING

CROSS REFERENCE TO RELATED APPLICATIONS

The present invention claims priority to U.S. Provisional Patent Application, Ser. No. 61/865,346, filed on Aug. 13, 2013, entitled "Inter-view Reference Picture Selection and Its Exception Handler in 3D Video Coding" and U.S. Provisional Patent Application, Ser. No. 61/895,468, filed on Oct. 25, 2013, entitled "Methods of deriving the default disparity vector in multiview and 3D video coding". The U.S. Provisional Patent Applications are hereby incorporated by reference in their entireties.

FIELD OF INVENTION

The present invention relates to three-dimensional video coding. In particular, the present invention relates to disparity vector derivation in 3D video coding.

BACKGROUND OF THE INVENTION

Three-dimensional (3D) television has been a technology trend in recent years that intends to bring viewers sensational viewing experience. Various technologies have been developed to enable 3D viewing. Among them, the multi-view video is a key technology for 3D TV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, multi-view video coding exploits inter-view redundancy. Various 3D coding tools have been developed or being developed by extending existing video coding standard. For example, there are standard development activities to extend H.264/AVC (advanced video coding) and HEVC (high efficiency video coding) to multi-view video coding (MVC) and 3D coding. The corresponding new standards being developed are referred as 3D-HEVC (High Efficiency Video Coding) or 3D-AVC (Advanced Video Coding) coding respectively. Various 3D coding tools developed or being developed for 3D-HEVC and 3D-AVC are reviewed as follows.

To share the previously coded texture information of adjacent views, a technique known as Disparity-Compensated Prediction (DCP) has been included in 3D-HTM (test Model for three-dimensional video coding based on HEVC (High Efficiency Video Coding)) as an alternative coding tool to motion-compensated prediction (MCP). MCP refers to an inter-picture prediction that uses previously coded pictures of the same view, while DCP refers to an inter-picture prediction that uses previously coded pictures of other views in the same access unit. FIG. 1 illustrates an example of 3D video coding system incorporating MCP and DCP. The vector (110) used for DCP is termed as disparity vector (DV), which is analog to the motion vector (MV) used in MCP. FIG. 1 illustrates three MVs (120, 130 and 140) associated with MCP. Moreover, the DV of a DCP block can also be predicted by the disparity vector predictor (DVP) candidate derived from neighboring blocks or the temporal collocated blocks that also use inter-view reference pictures. In current 3D-HTM, when deriving an inter-view Merge candidate for Merge/Skip modes, if the motion information of corresponding block is not available or not valid, the inter-view Merge candidate is replaced by a DV.

Inter-view motion prediction is used to share the previously encoded motion information of reference views. For deriving candidate motion parameters for a current block in a dependent view, a DV for current block is derived first, and then the prediction block in the already coded picture in the reference view is located by adding the DV to the location of current block. If the prediction block is coded using MCP, the associated motion parameters can be used as candidate motion parameters for the current block in the current view. The derived DV can also be directly used as a candidate DV for DCP.

Inter-view residual prediction is another coding tool used in 3D-HTM. To share the previously coded residual information of adjacent views, the residual signal of the current prediction block (i.e., PU) can be predicted by the residual signals of the corresponding blocks in the inter-view pictures. The corresponding blocks can be located by respective DVs. The video pictures and depth maps corresponding to a particular camera position are indicated by a view identifier (i.e., V0, V1 and V2). All video pictures and depth maps that belong to the same camera position are associated with the same viewId (i.e., view identifier). The view identifiers are used for specifying the coding order within the access units and detecting missing views in error-prone environments. An access unit includes all video pictures and depth maps corresponding to the same time instant. Inside an access unit, the video picture and, when present, the associated depth map having viewId equal to 0 are coded first, followed by the video picture and depth map having viewId equal to 1, etc. The view with viewId equal to 0 (i.e., V0) is also referred to as the base view or the independent view. The base view video pictures can be coded using a conventional HEVC video coder without dependence on other views.

For the current block, motion vector predictor (MVP)/disparity vector predictor (DVP) can be derived from the inter-view blocks in the inter-view pictures. In the following, inter-view blocks in inter-view picture may be abbreviated as inter-view blocks. The derived candidate is termed as inter-view candidates, which can be inter-view MVPs or DVPs. The coding tools that codes the motion information of a current block (e.g., a current prediction unit, PU) based on previously coded motion information in other views is termed as inter-view motion parameter prediction. Furthermore, a corresponding block in a neighboring view is termed as an inter-view block and the inter-view block is located using the disparity vector derived from the depth information of current block in current picture.

View Synthesis Prediction (VSP) is a technique to remove inter-view redundancies among video signal from different viewpoints, in which synthetic signal is used as references to predict a current picture. In 3D-HEVC test model, HTM-7.0, there exists a process to derive a disparity vector predictor, known as NBDV (Neighboring Block Disparity Vector). The derived disparity vector is then used to fetch a depth block in the depth image of the reference view. The procedure to derive the virtual depth can be applied for VSP to locate the corresponding depth block in a coded view. The fetched depth block may have the same size of the current prediction unit (PU), and it will then be used to do backward warping for the current PU. In addition, the warping operation may be performed at a sub-PU level precision, such as 2×2 or 4×4 blocks.

In current implementation, VSP is only applied for texture component coding. Also the VSP prediction is added as a new merging candidate to signal the use of VSP prediction. In such a way, a VSP block may be a skipped block without any residual, or a Merge block with residual information coded. The VSP-based merging candidate may also be referred as VSP merging candidate for convenience in this disclosure.

When a picture is coded as B picture and the current block is signaled as VSP predicted, the following steps are applied to determine the prediction direction of VSP:

Obtain the view index refViewIdxNBDV of the derived disparity vector from NBDV;

Obtain the reference picture list RefPicListNBDV (either RefPicList0 or RefPicList1) that is associated with the reference picture with view index refViewIdxNBDV;

Check the availability of an interview reference picture with view index refViewIdx that is not equal to refViewIdxNBDV in the reference picture list other than RefPicListNBDV;

If such a different interview reference picture is found, bi-direction VSP is applied. The depth block from view index refViewIdxNBDV is used as the current block's depth information (in case of texture-first coding order), and the two different interview reference pictures (each from one reference picture list) are accessed via backward warping process and further weighted to achieve the final backward VSP predictor;

Otherwise, uni-direction VSP is applied with RefPicListNBDV as the reference picture list for prediction.

When a picture is coded as a P picture and the current prediction block is using VSP, uni-direction VSP is applied.

It is noted that, when adding the VSP Merge candidate, the VSP flag is always set as true no matter if there is an inter-view reference picture with the view index equal to the view index of the inter-view reference picture pointed by the derived DV.

The DV is critical in 3D video coding for inter-view motion prediction, inter-view residual prediction, disparity-compensated prediction (DCP), view synthesis prediction (VSP) or any other tools which need to indicate the correspondence between inter-view pictures. The DV derivation utilized in current test model of 3D-HEVC is described as follow.

DV Derivation in 3D-HEVC. Currently, except for the DV for DCP, the DVs used for the other coding tools are derived using either the scheme of neighboring block disparity vector (NBDV) or the scheme of depth oriented neighboring block disparity vector (DoNBDV) as described below.

Neighboring block disparity vector (NBDV). In the current 3D-HEVC, a disparity vector can be used as a DVP candidate for Inter mode or as a Merge candidate for Merge/Skip mode. A derived disparity vector can also be used as an offset vector for inter-view motion prediction and inter-view residual prediction. When used as an offset vector, the DV is derived from spatial and temporal neighboring blocks as shown in FIGS. 2A-2B. Multiple spatial and temporal neighboring blocks are determined and DV availability of the spatial and temporal neighboring blocks is checked according to a pre-determined order. This coding tool for DV derivation based on neighboring (spatial and temporal) blocks is termed as Neighboring Block DV (NBDV). The temporal neighboring block set, as shown in FIG. 2A, is searched first. The temporal merging candidate set includes the location at the center of the current block (i.e., BCTR) and the location diagonally across from the lower-right corner of the current block (i.e., RB) in a temporal reference picture. The temporal search order starts from RB to BCTR. Once a block is identified as having a DV, the checking process will be terminated. The spatial neighboring block set includes the location diagonally across from the lower-left corner of the current block (i.e., A0), the location next to the left-bottom side of the current block (i.e., A1), the location diagonally across from the upper-left corner of the current block (i.e., B2), the location diagonally across from the upper-right corner of the current block (i.e., B0), and the location next to the top-right side of the current block (i.e., B1) as shown in FIG. 2B. The search order for the spatial neighboring blocks is (A1, B1, B0, A0, B2).

If a DCP coded block is not found in the neighboring block set (i.e., spatial and temporal neighboring blocks as shown in FIGS. 2A and 2B), the disparity information can be obtained from another coding tool, named DV-MCP. In this case, when a spatial neighboring block is MCP coded block and its motion is predicted by the inter-view motion prediction, as shown in FIG. 3, the disparity vector used for the inter-view motion prediction represents a motion correspondence between the current and the inter-view reference picture. This type of motion vector is referred to as inter-view predicted motion vector and the blocks are referred to as DV-MCP blocks. FIG. 3 illustrates an example of a DV-MCP block, where the motion information of the DV-MCP block (310) is predicted from a corresponding block (320) in the inter-view reference picture. The location of the corresponding block (320) is specified by a disparity vector (330). The disparity vector used in the DV-MCP block represents a motion correspondence between the current and inter-view reference picture. The motion information (322) of the corresponding block (320) is used to predict motion information (312) of the current block (310) in the current view.

To indicate whether a MCP block is DV-MCP coded and to store the disparity vector for the inter-view motion parameters prediction, two variables are used to represent the motion vector information for each block:

dvMcpFlag, and dvMcpDisparity.

When dvMcpFlag is equal to 1, the dvMcpDisparity is set to indicate that the disparity vector is used for the inter-view motion parameter prediction. In the construction process for the AMVP mode and Merge candidate list, the dvMcpFlag of the candidate is set to 1 if the candidate is generated by inter-view motion parameter prediction and is set to 0 otherwise. If neither DCP coded blocks nor DV-MCP coded blocks are found in the above mentioned spatial and temporal neighboring blocks, then a zero vector can be used as a default disparity vector.

Depth Oriented Neighboring Block Disparity Vector (DoNBDV). A method to enhance the NBDV by extracting a more accurate disparity vector from the depth map is utilized in current 3D-HEVC. A depth block from coded depth map in the same access unit is first retrieved and used as a virtual depth of the current block. To be specific, the refined DV is converted from the maximum disparity of the pixel subset in the virtual depth block which is located by the DV derived using NBDV. This coding tool for DV derivation is termed as Depth-oriented NBDV (DoNBDV).

In HEVC, two different modes for signaling the motion parameters for a block are specified. In the first mode, which is referred to as adaptive motion vector prediction (AMVP) mode, the number of motion hypotheses, the reference indices, the motion vector differences, and indications specifying the used motion vector predictors are coded in the bitstream. The second mode is referred to as Merge mode. For this mode, only an indication is coded, which signals the set of motion parameters that are used for the block. In the current 3D-HEVC, during the process of collecting motion hypotheses for AMVP, if the reference picture type of spatial neighbor is the same as the reference picture type of current PU (inter-view or temporal) and the picture order count (POC) of the reference picture of spatial neighbor is equal to the POC of the reference picture of the current PU, the motion information of spatial neighbor is directly used as the motion hypothesis of the current PU.

In the conventional scheme, the inter-view reference picture pointed by the derived DV may not be included in the reference picture lists of the current PU. Therefore, while the VSP mode may still be selected (i.e., VSP flag could be set as true), however, the VSP process cannot be performed if the inter-view reference picture pointed by the derived DV may not be included in the reference picture lists of the current PU. In this case, the VSP mode does not have any effective motion information if the VSP mode does get selected. As a result, a mismatch between encoder and decoder will occur.

Furthermore, in the conventional 3D-HEVC, the Neighboring Block Disparity Vector (NBDV) derivation process checks the availability of disparity vector (DV) associated with spatial and temporal neighboring blocks. If no DV can be derived from the neighboring blocks, a default DV with a zero-valued vector pointing to the base view (with a view index equal to 0) is used. The DV derived by NBDV can be further used by the process of depth-oriented NBDV (DoNBDV) to derive a refined DV. An example of disparity vector derivation process of NBDV (steps 1-2) and DoNBDV (step 3) according to HTM-8.0 is illustrated as follows.

1. The disparity vector (DV) is set to (0, 0) initially.
2. The NBDV derivation is performed as follows.
   a) Search the temporal neighboring blocks to determine if the disparity vector can be found in these temporal neighbouring blocks. Once a DV is found, the DV found is used as the output of the NBDV process and the process is terminated. In HTM-8.0, two temporal neighboring blocks are used, including a co-located block in co-located picture and a co-located block in RAP (Random Access Point) picture, where the two co-located blocks correspond to a central block in the co-located picture and the RAP picture respectively as shown in FIG. 4A.
   b) Search the spatial neighbouring blocks (i.e., blocks A1 and B1 as shown in FIG. 4B) to determine if a disparity vector can be found in these spatial neighbouring blocks. Once a DV is found, the DV found is used as the output of the NBDV process and the process is terminated.
   c) Search the spatial neighbouring blocks (i.e., blocks A1 and B1 as shown in FIG. 4B) to determine if an intrinsic disparity vector can be found in these spatial neighbouring blocks. The intrinsic disparity vector is the disparity information obtained from spatial neighboring DV-MCP blocks whose motion is predicted from a corresponding block in the inter-view reference picture where the location of the corresponding blocks is specified by a disparity vector as shown in FIG. 3. The disparity vector used in the DV-MCP block represents a motion correspondence between the current and inter-view reference pictures. Once an intrinsic DV is found, the found DV is used as the output of the NBDV process and the process is terminated.
   d) If there is still no DV found, a zero vector with a zero view index is used as a default output for the NBDV process.
3. If a flag (i.e., depth_refinement_flag) indicating whether NBDV is further refined from the depth map, is equal to 1, then a refined NBDV, DVref is derived as follows.
   a) Find the corresponding depth block of the reference view by using NBDV,
   b) Select the representative depth value in the corresponding depth block, and
   c) Convert the representative depth value to the disparity vector.

In current 3D-HEVC, NBDV is used to derive a DV from the spatial or temporal neighboring blocks based on a predefined order. When no DV can be derived from the neighboring blocks, a default DV with a zero vector pointing to the base view (with a view index equal to 0) is used. However, there may be cases that the base view reference picture is not included in the reference picture list of a current image unit (e.g., a slice or a largest coding unit). Under this condition, the default DV may point to a non-existing reference picture and this may cause mismatch between an encoder and decoder due to this invalid view index.

SUMMARY OF THE INVENTION

A method and apparatus for a three-dimensional or multi-view video encoding or decoding system utilizing unified disparity vector (DV) derivation is disclosed. When a three-dimensional coding tool using a derived disparity vector is selected, embodiments according to the present invention will first obtain the derived DV from one or more neighboring blocks of the current block. If the derived DV is available, the selected three-dimensional coding tool is applied to the current block using the derived DV. If the derived DV is not available, the selected three-dimensional coding tool is applied to the current block using a default DV, where the default DV is set to point to the inter-view reference picture in a reference picture list of the current block. If the derived DV is not available and no inter-view reference picture can be found in any reference picture list of the current block, the default DV can be set to a default view index corresponding to −1, which means the selected three-dimensional coding tool should be disabled. The default DV can be determined at each slice level or each picture level. In some embodiments, the derived DV is available if a first inter-view reference picture in a first view associated with the derived DV is in one reference picture list of the current block. The derived DV for the current block can be derived from one or more spatial neighboring block of the current block, one or more temporal neighboring block of the current block, or one or more spatial and one or more temporal neighboring blocks of the current block.

One aspect of the present invention addresses the view index selection for the default DV. The view index of the default DV may be set to the view index of the inter-view reference picture of the current slice or picture with a minimum view index. The view index of the default DV may also be set to the view index of any inter-view reference picture of the current slice or picture. In yet another example, the view index of the default DV is set to the view index of the inter-view reference picture of the current slice or picture having a nearest view index, where the nearest view index is measured based on view distance or view index difference with the current slice or picture. Furthermore, the view index of the default DV can be set to the view index of the inter-view reference picture having smallest quantization parameters.

In another embodiment, the view index of the default DV is set to the view index of an inter-view reference picture that is found firstly among a search set according to a search order. The search set includes all inter-view reference pictures in one or two reference lists of the current block and the search order starts from a zero picture index to a maximum reference picture index. When the current block corresponds to a prediction unit (PU) in a B slice, the inter-view reference pictures in the reference list-0 can be searched before or after the inter-view reference pictures in the reference list-1, or the inter-view reference pictures can be searched in an interleaved order between the reference list-0 and the reference list-1.

Another aspect of the present invention addresses the vector value for the default DV. The vector value of the default DV can be set to a zero vector or a default vector. The default vector can be set to a converted disparity that is derived from a default depth value. The default depth value can be explicitly signaled or implicitly determined for both an encoder and a decoder. The default depth value can be determined based on a middle value, a mean value, or a medium value of valid depth values, or based on a dominant depth value. The dominant depth value can be determined based on statistic of previously reconstructed depth values.

The default vector can also be set to a selected disparity from default disparity values. The default disparity values can be explicitly signaled or implicitly determined for both an encoder and a decoder.

The selected disparity can determined based on a middle value, a mean value, or a medium value of the set of the default disparity values, or based on a dominant disparity value. The dominant disparity value is determined based on statistic of previously reconstructed disparity vectors.

BRIEF DESCRIPTION OF THE DRAWINGS

FIGS. 2A-2B illustrate an example of spatial neighboring blocks of the current block belonging to a set for derivation of the VSP merging candidate according to HEVC-based 3D test Model version 7.0 (HTM-7.0).

FIG. 3 illustrates an example of a disparity derivation from motion-compensated prediction (DV-MCP) block, where the location of the corresponding blocks is specified by a disparity vector.

FIGS. 4A-4B illustrate an example of temporal and spatial neighboring blocks of the current block belonging to a set for derivation of the VSP merging candidate according to HEVC-based 3D test Model version 8.0 (HTM-8.0).

DETAILED DESCRIPTION

Figure 1:
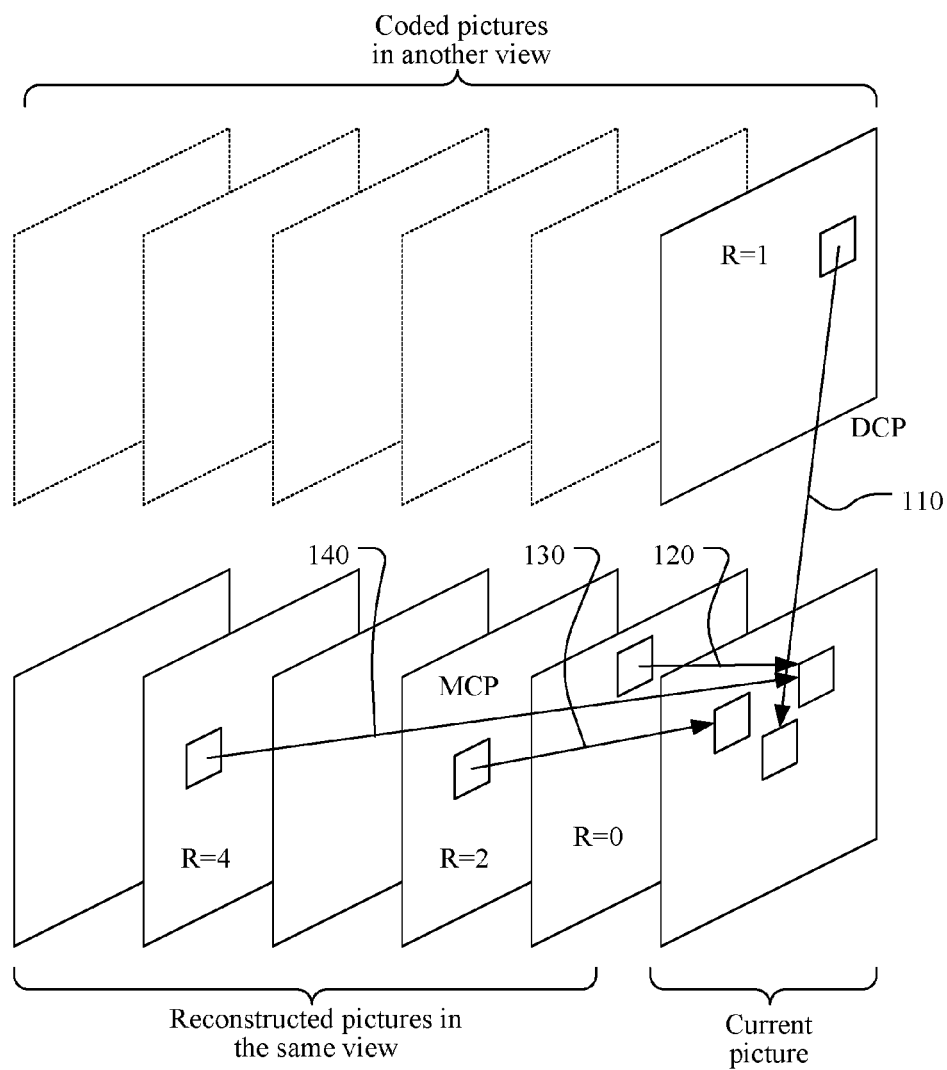
FIG. 1 illustrates an example of three-dimensional video coding incorporating disparity-compensated prediction (DCP) as an alternative to motion-compensated prediction (MCP).

As described above, disparity vector (DV) is widely used in various coding tools for three-dimensional video coding system. However, the inter-view reference picture pointed by the derived DV may not be included in the reference picture lists of current block (e.g. a prediction unit (PU)). If the VSP mode is selected in this case, the VSP process cannot be correctly performed. Furthermore, the default DV corresponding to a zero-valued vector pointing to a base view may cause issue if the base view reference picture is not included in the reference picture list of the current image unit (e.g., a slice or a largest coding unit).

Accordingly, embodiments of the present invention disclose a disparity vector derivation process that derives a disparity vector or a default disparity vector free from the issues occurring in the conventional approach. In the first embodiment, if there is no available DV or no inter-view reference picture with the view index equal to the view index of the derived DV in the reference picture lists of current (e.g., a prediction unit (PU)), the VSP flag is set to "false". In other words, the VSP mode is disabled for the current block.

In current 3D-HEVC, the default view index is set to zero when no DV can be found according to a DV derivation process (e.g. NBDV). However, the inter-view reference picture with zero view index may not be in the reference picture lists. Therefore, the default DV with a zero view index becomes invalid in this case. Accordingly, another set of embodiments of the present invention modify the reference view index used by the conventional approach to avoid the issue. In the second embodiment of the present invention, the vector of the default DV is set to a default value (e.g., a zero vector) and the reference view index is set to the minimum view index of the inter-view reference pictures in the reference picture lists of the current slice or picture. In the third embodiment, the vector of the default DV is set to a default value (e.g., a zero vector) and the reference view index is set to the view index of the inter-view reference picture which is the nearest one in terms of the view distance. If more than one has the same nearest view distance, the one with smaller view index is selected. In the fourth embodiment, the vector of the default DV is set to a default value (e.g., a zero vector) and the reference view index is set to the view index of any inter-view reference picture in the reference picture lists of the current PU. Accordingly, the inter-view reference picture pointed by the DV derived from NBDV always corresponds to an inter-view reference picture in the reference picture lists of the current picture. When no inter-view reference pictures exist in the reference picture lists of the current PU, the default view index is set to −1 to indicate the invalidity of the derived DV. In this case when the view index associated with the derived DV is equal to −1, the VSP mode is not allowed for the current PU.

In the fifth embodiment, the reference view index of the default DV is set to the minimum view index of the inter-view reference pictures in the reference picture lists of the current slice/picture. The vector of the default DV is set to the DV converted by a default depth value (e.g. the middle or mean value of the valid depth values or the dominant depth value). Specifically, the DV is converted by calculating the projection vector between the current view and the corresponding view which is identified by the view index assigned to the default DV with the help of the camera parameters.

In the sixth embodiment, the vector of the default DV is set to a default value (e.g., a zero vector) and the reference view index of the default DV is set to the nearest one in terms of the view distance or difference of the view index in the reference picture lists of the current slice/picture. If more than one has the same nearest view distance, the one with smaller view index is selected. The vector of the default DV is set to the DV converted by a default depth value (e.g. middle or mean value of the valid depth values or dominant depth value). Specifically, the DV is converted by calculating the projection vector between the current view and the corresponding view which is identified by the view index assigned to the default DV with the help of the camera parameters.

In the seventh embodiment, the view index of the default DV is set to the view index of the first inter-view reference picture by searching the reference picture with the reference index from zero to the maximum reference index in the reference picture list 0 and list 1. The searching order for list 0 and list 1 may correspond to searching all reference pictures in list 0 first and then searching all reference pictures in list 1. The searching order for list 0 and list 1 may also be interleaved searching, i.e. alternatingly searching part of list and list 1. The vector of the default DV is set as a default vector (e.g. a zero vector).

In the eighth embodiment, the view index of the default DV is set to the first inter-view reference picture by searching the reference picture with the reference index from zero to the maximum reference index in the reference picture list 0 and list 1. The searching order for list 0 and list 1 may correspond to searching all reference pictures in list 0 first and then searching all reference pictures in list 1. The vector of the default DV is set to the DV converted by a default depth value (e.g. middle or mean value of the valid depth values or dominant depth value). Specifically, the DV is converted by calculating the projection vector between the current view and the corresponding view which is identified by the view index assigned to the default DV with the help of the camera parameters. When no inter-view reference pictures is included in the reference picture lists of the current slice/picture, the coding tools that utilize the derived DV (e.g. view synthesis prediction, inter-view residual prediction and advanced residual prediction (ARP)) will not be allowed. In this case, the view index associated with the derived DV is set to −1.

Multiple examples of selecting a valid view index for the default DV have been illustrated above. However, these examples are not meant for providing an exhaustive list of valid view index selection. A skilled person may select other valid view index for the default DV. For example, the view index of the default DV can be set to the view index of the inter-view reference picture having smaller QP parameters.

If more than one inter-view reference picture having the same smaller QP parameters, the one with smaller view index is selected.

Another aspect of the present invention addresses syntax design to support the needed modification to overcome the issues in the conventional system. Accordingly, in the ninth embodiment, the exemplary syntax design to support the needed modification is illustrated as follows.

When no DV is available, the reference view index (i.e., refViewIdx) is set equal to 0, and the disparity vector is (i.e., mvDisp) is set equal to a default value, (i.e., (0, 0)). The variable of the refined disparity DV (i.e., mvRefinedDisp) is set equal to mvDisp.

for (Vid=0, foundFlag=0; Vid<ViewIdx && !found-
   Flag; Vid++)                                             (a)

for (X=0; X<(the current slice is a B slice? 2:1) &&
   !foundFlag; X++)                                         (b)

for (i=0; i<NumRefPicsLX && !foundFlag; i++)                  (c)

When ViewIdx(RefPicListX[i]) is equal to Vid and
   PicOrderCnt(RefPicListX[i])==PicOrderCnt of
   the current picture, refViewIdx is set equal to
   Vid and foundFlag is set equal to 1.                     (d)

In the above syntax, foundFlag is a flag indicating whether an inter-view reference picture has been found in the reference picture lists. Loop (a) of the syntax is associated with the search through all views (i.e., from Vid=0 to Vid=ViewIdx −1, where ViewIdx is the number of views). Loop (a) is terminated whenever an inter-view reference picture is found in the reference picture lists (as indicated by "!foundFlag"). Loop (b) of the syntax is associated with the reference list. For B pictures, two reference lists are used and otherwise, one reference list is used. Also, loop (b) is terminated whenever an inter-view reference picture is found in the reference picture lists (as indicated by "!foundFlag"). Loop (c) of the syntax is associated with the search through all reference pictures in the corresponding reference list (i.e., from i=0 to i=NumRefPicsLX −1, where NumRefPicsLX is the number of reference picture in reference list LX). Loop (c) is terminated whenever an inter-view reference picture is found in the reference picture lists (as indicated by "!foundFlag"). In procedure (d), it checks whether the picture order count of an underlying reference picture in the reference list (i.e., RefPicListX[i]) is equal to the picture order count of the current picture. If so, the reference view index of the default DV (i.e., refViewIdx) is set to the view index of the inter-view reference picture (i.e., Vid) and foundFlag is set to 1 to terminate the process.

In the tenth embodiment, another exemplary syntax design to support the needed modification is illustrated as follows.

When no DV is available, the reference view index (i.e., refViewIdx) is set equal to 0, and the disparity vector is (i.e., mvDisp) is set equal to a default value, (i.e., (0, 0)). The variable of the refined disparity DV (i.e., mvRefinedDisp) is set equal to mvDisp.

for (Vid=0, foundFlag=0; Vid<ViewIdx && !found-
   Flag; Vid++)                                             (a)

for (X=0; X<(the current slice is a B slice? 2:1) &&
   !foundFlag; X++)                                         (b)

for (i=0; i<NumRefPicsLX && !foundFlag; i++)                  (c)

When ViewIdx(RefPicListX[i]) is equal to Vid and
   PicOrderCnt(RefPicListX[i])==PicOrderCnt of the current picture, refViewIdx is set equal to
Vid and foundFlag is set equal to 1.     (e)

In the above syntax, loop (a) through loop (c) are also used as in the previous case. In procedure (e), it checks whether the view index of an underlying reference picture in the reference list (i.e., RefPicListX[i]) is equal to the underlying view index. If so, the reference view index of the default DV (i.e., refViewIdx) is set to the underlying view index (i.e., Vid) and foundFlag is set to 1 to terminate the process. Variable Vid starts from 0 and increments for each iteration. The view index assigned to the default according to the above syntax corresponds to a smallest view index.

Figure 5:
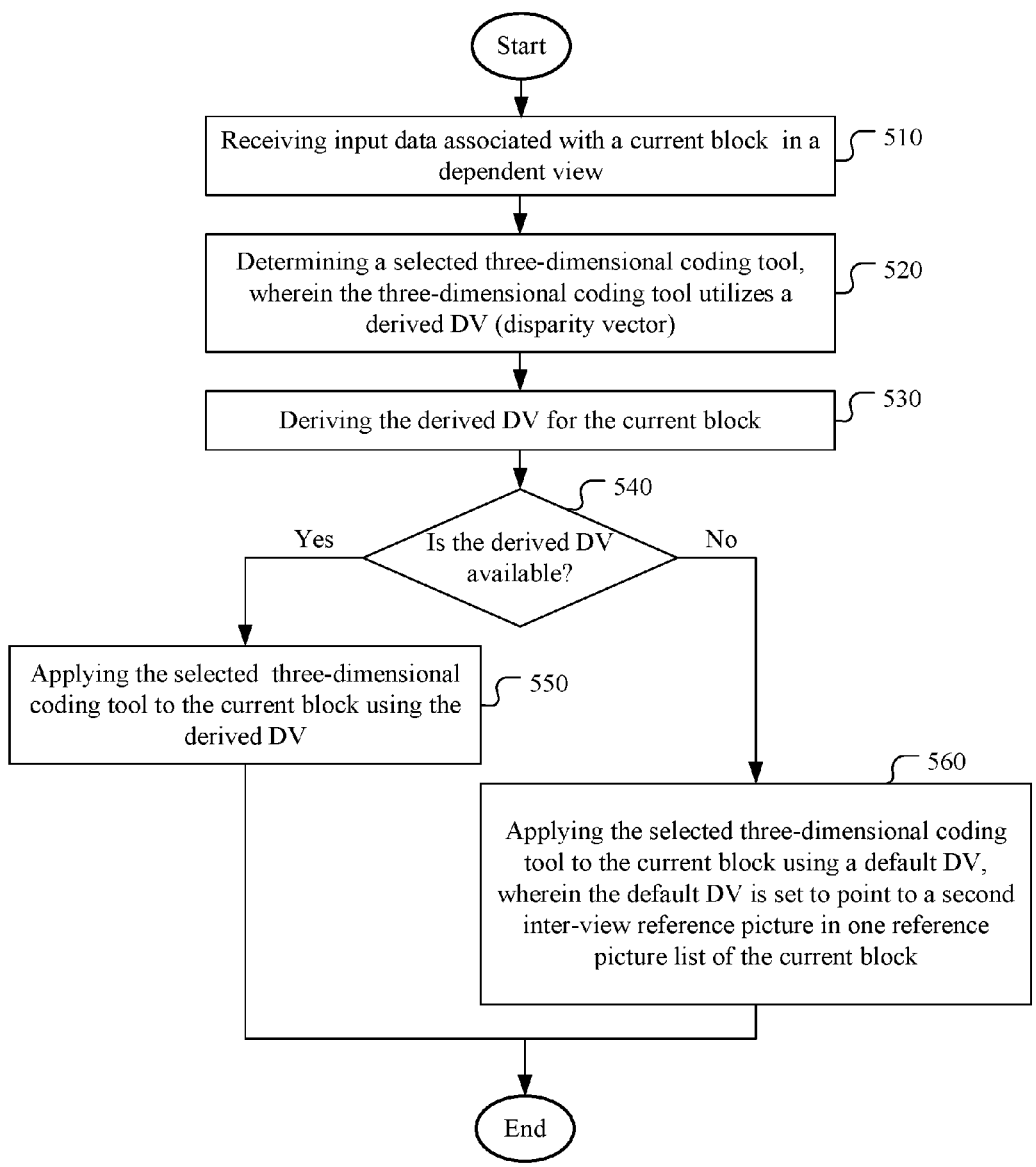
FIG. 5 illustrates an exemplary flowchart of three-dimensional or multi-view video encoding or decoding that uses unified disparity vector derivation according to an embodiment of the present invention.

FIG. 5 illustrates an exemplary flowchart of three-dimensional or multi-view video encoding or decoding that uses unified disparity vector derivation according to an embodiment of the present invention. The system receives input data associated with a current block in a dependent view as shown in step 510. The input data may correspond to un-coded or coded texture data. The input data may be retrieved from storage such as a computer memory, buffer (RAM or DRAM) or other media. The video bitstream may also be received from a processor such as a controller, a central processing unit, a digital signal processor or electronic circuits that produce the input data. A selected three-dimensional coding tool is selected in step 520, where the three-dimensional coding tool utilizes a derived DV (disparity vector). The derived DV for the current block is derived in step 530. The availability of the derived DV is checked in step 540. If the derived DV is available (i.e., "Yes" path), the selected three-dimensional coding tool is applied to the current block using the derived DV in step 550. If the derived DV is not available (i.e., "No" path), the selected three-dimensional coding tool is applied to the current block using a default DV in step 560, where the default DV is set to point to a second inter-view reference picture in one reference picture list of the current block.

The flowchart shown above is intended to illustrate examples of unified disparity vector derivation. A person skilled in the art may modify each step, re-arranges the steps, split a step, or combine steps to practice the present invention without departing from the spirit of the present invention.

In an embodiment of the present invention, input data associated with a current block in a dependent view is received. The input data may correspond to un-coded or coded texture data. The input data may be retrieved from storage such as a computer memory, buffer (RAM or DRAM) or other media. A video bitstream may also be received from a processor such as a controller, a central processing unit, a digital signal processor or electronic circuits that produce the input data. A selected three-dimensional coding tool using a derived DV is determined, where the derived DV for a current block is obtained from one or more spatial neighboring block and one or more temporal neighboring block of the current block. The selected three-dimensional coding tool is applied to the current block using the derived DV if the derived DV is available. If the derived DV is not available, the selected three-dimensional coding tool is applied to the current block using a default DV, wherein the default DV is set to point to an inter-view reference picture in one reference picture list of the current block. The availability of the derived DV may be determined by checking if a first inter-view reference picture in a first view associated with the derived DV is in one reference picture list of the current block.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding for a three-dimensional or multi-view video encoding or decoding system, the method comprising:
    receiving input data associated with a current block in a dependent view;
    performing a disparity vector (DV) deriving process for deriving a derived DV for the current block from one or more neighboring block of the current block;
    determining whether the derived DV is available as a result of the DV deriving process;
    in a case that the derived DV is determined to be available, encoding or decoding the current block using the derived DV; and
    in a case that no derived DV is determined to be available,
        in a case that at least one reference picture list of the current block includes at least one inter-view reference picture, encoding or decoding the current block using a first default DV, wherein the first default DV is set to point to an inter-view reference picture that is in a reference picture list of the current block, and in a case that no inter-view reference picture is in any reference picture list of the current block, processing the current block according to a second default DV, wherein a default view index of the second default DV is set to a value that indicates invalidity of the derived DV.

2. The method of claim 1, wherein the derived DV is available if a first interview reference picture in a first view associated with the derived DV is in the reference picture list of the current block.

3. The method of claim 1, wherein the encoding or decoding the current block is performed using VSP (view synthesis prediction).

4. The method of claim 1, wherein
a default view index of the first default DV is set to a view index of an inter-view reference picture of a current slice or a current picture with a minimum view index, and
the current slice or the current picture contains the current block.

5. The method of claim 1, wherein a default view index of the first default DV is set to a view index of any inter-view reference picture in the reference picture list of the current block.

6. The method of claim 1, wherein
a default view index of the first default DV is set to a view index of an inter-view reference picture of a current slice or picture having a nearest view index,
the nearest view index is measured based on a view distance or a view index difference with respect to the current slice or the current picture, and
the current slice or the current picture contains the current block.

7. The method of claim 1, wherein the default view index of the second default DV is set to −1.

8. The method of claim 1, wherein a default view index of the first default DV is set to a view index of an inter-view reference picture having smallest quantization parameters.

9. The method of claim 1, wherein
a default view index of the first default DV is set to a view index of an inter-view reference picture that is found firstly among a search set according to a search order,
the search set includes all inter-view reference pictures in one or two reference lists of the current block, and
the search order starts from a zero picture index to a maximum reference picture index.

10. The method of claim 9, wherein
the search set includes all inter-view reference pictures in a reference list-0 and a reference list-1 of the current block when the current block corresponds to a prediction unit (PU) in a B slice, and
the inter-view reference pictures in the reference list-0 are searched before or after the inter-view reference pictures in the reference list-1, or the inter-view reference pictures are searched in an interleaved order between the reference list-0 and the reference list-1.

11. The method of claim 1, wherein
a default view index of the first default DV is set to a view index of an inter-view reference picture that is found firstly among a search set according to a search order,
the search set includes all inter-view reference pictures in one or two reference lists of the current block, and
the search order starts from a zero view index to a reference view index that equals a current view index minus 1.

12. The method of claim 11, wherein
the search set includes all inter-view reference pictures in a reference list-0 and a reference list-1 of the current block when the current block corresponds to a prediction unit (PU) in a B slice, and
the inter-view reference pictures in the reference list-0 are searched before or after the inter-view reference pictures in the reference list-1, or the inter-view reference pictures are searched in an interleaved order between the reference list-0 and the reference list-1.

13. The method of claim 1, wherein a vector value of the first default DV is set to a zero vector or a default vector.

14. The method of claim 13, wherein the default vector is derived from a converted disparity that is converted from a default depth value.

15. The method of claim 14, wherein the default depth value is explicitly signaled or implicitly determined.

16. The method of claim 14, wherein the default depth value is determined based on a middle value, a mean value, or a medium value of valid depth values, or based on a dominant depth value.

17. The method of claim 13, wherein the default vector is set to a selected disparity from default disparity values.

18. The method of claim 1, wherein the first default DV is determined at each slice level or each picture level.

19. The method of claim 1, wherein the derived DV for the current block is derived from one or more spatial neighboring block of the current block, one or more temporal neighboring block of the current block, or one or more spatial and one or more temporal neighboring blocks of the current block.

20. An apparatus for video encoding or decoding, the apparatus comprising:
a processing circuit configured to:
receive input data associated with a current block in a dependent view;
perform a disparity vector (DV) deriving process for deriving a derived DV for the current block from one or more neighboring block of the current block;
determine whether the derived DV is available as a result of the DV deriving process;
in a case that the derived DV is determined to be available, encode or decode the current block using the derived DV; and
in a case that no derived DV is determined to be available,
in a case that at least one reference picture list of the current block includes at least one inter-view reference picture, encode or decode the current block using a first default DV, wherein the first default DV is set to point to an inter-view reference picture that is in a reference picture list of the current block, and
in a case that no inter-view reference picture is in any reference picture list of the current block, process the current block according to a second default DV, wherein a default view index of the second default DV is set to a value that indicates invalidity of the derived DV.

* * * * *